INVENTOR.
RAYMOND H. REX
BY CHARLES S. LYNCH
& W. A. SCHAICH
ATTORNEYS

June 18, 1963    R. H. REX    3,093,861
METHOD OF AND APPARATUS FOR MAKING PLASTIC ARTICLES
Filed May 12, 1961                           2 Sheets-Sheet 2

INVENTOR.
RAYMOND H. REX
BY CHARLES S. LYNCH
& W. A. SCHAICH
ATTORNEYS

3,093,861
METHOD OF AND APPARATUS FOR MAKING PLASTIC ARTICLES
Raymond H. Rex, Toledo, Ohio, assignor to Owens-Illinois Glass Company, a corporation of Ohio
Filed May 12, 1961, Ser. No. 109,762
6 Claims. (Cl. 18—12)

The present invention relates to an intermittently operable plasticizer-extruder, and more particularly to a plasticizer-extruder of the screw-type in which the screw is continuously rotated, the feeding of solid plastic material to the screw being regulated in accordance with the plastice output pressure developed by the screw.

In the development of various processes for making plastic articles from plastic material plasticized under heat and pressure by a screw-type extruder-plasticizer, several different types of apparatus capable of intermittently issuing plasticized material through an extrusion orifice or the like have been developed. A typical intermittently operated device may use a screw-type extruder wherein the screw is stopped during those periods when plasticized material is not being issued from the extrusion orifice. Such starting and stopping of the screw results in an inefficient operation because of the inertia loads on the screw, the loss of output pressure when the screw is stopped, and the possibility of the immobile plasticized material setting up during idle periods of the screw. As an alternative, various devices for recirculating and/or accumulating the output from the plasticizer-extruder screw during those periods when material is not being issued from the orifice have been developed. Such devices also suffer from various inefficiencies due to the possibility of "dead spots" in which the plasticized material can accumulate and thermally degrade, the possibility of recirculating the same increment of plastic material through the system several times with consequent thermal degradation, and the necessity of providing complicated and accurate controls for correlating the capacity of the screw with the capacity of the accumulator and for timing the dispensing of material from the accumulator and/or the screw through the orifice.

The present invention now proposes a new and novel solution of this problem of intermittently operable plasticizer-extruders of the screw-type by regulating the feeding of solid plastic material to the screw in accordance with the output pressures generated by the screw itself. More specifically, the screw, as is usual in plasticizer-extruders of this type, operates within a cylindrical barrel which is externally heated to plasticize solid material supplied to the rear end of the screw for travel along the screw and eventual expression through an extrusion orifice or the like.

A valve is provided for controlling communication between the exit end of the screw and the extruder orifice, closure of the valve isolating the screw from the orifice. Upon continued rotation of the screw in the barrel, the plasticized material is confined and generates pressures substantially in excess of those normal material pressures generated during the expression of plasticized material through the orifice. This greater pressure is preferably utilized by the device of the present invention to shift the screw rearwardly against a yieldable support, such as a single acting fluid-pressure-actuated cylinder, while screw rotation is continued.

This rearward shifting of the screw against its own output pressure is utilized to throttle the feeding of solid plastic material to the screw so as to reduce the amount of material fed to the screw, thereby reducing the pressure of plasticized material supplied by the screw. In this manner, the regulation of pressure by the screw is readily accomplished, and the resistance of the screw to shifting movement for throttling the feeding of solid plastic material accurately governs the pressures generated at the output end of the screw.

Upon establishing communication between the output end of the screw and the orifice, the fluid pressure actuated cylinder or other screw resistance element displaces the screw forwardly so as to quickly dispense the previously accumulated material through the orifice, while at the same time establishing full communication between the inlet end of the screw and the supply of solid plasticized material so that normal plasticizer-extruder operation is automatically re-established.

It is, therefore, an important object of the present invention to provide an intermittently operable plasticizer-extruder of the screw type in which the screw is continuously rotated and in which the feeding of plastic material to the screw is regulated in accordance with the plastic output pressure developed by the screw.

Another important object of the present invention is the provision of an intermittently operable screw-type plasticizer-extruder in which a screw is continuously driven for rotation, the screw being axially displaceable in response to output pressure developed by the screw itself in order to regulate the feeding of additional plastic material to the screw to be plasticized thereby.

It is a further object of this invention to provide a method of plasticizing thermoplastic material wherein the pressure generated by a plasticizing screw is utilized to regulate the flow of fresh plastic material thereto while the screw is continuously rotated to maintain a predetermined output pressure.

A further, and no less important, object of the present invention is the provision of a method of intermittently operating a plasticizer-extruder of the screw-type wherein the generation of excess pressure at the outlet end of the screw displaces the screw axially to decrease the amount of raw plastic material fed to the screw in order to maintain a constant output pressure at the outlet end of the screw.

Yet another important object of this invention is the provision of a plasticizer-extruder having a screw continuously driven for rotation and axially shiftable in response to the generation of greater-than-predetermined pressures at its outlet end to decrease the amount of raw plastic material fed to the screw.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
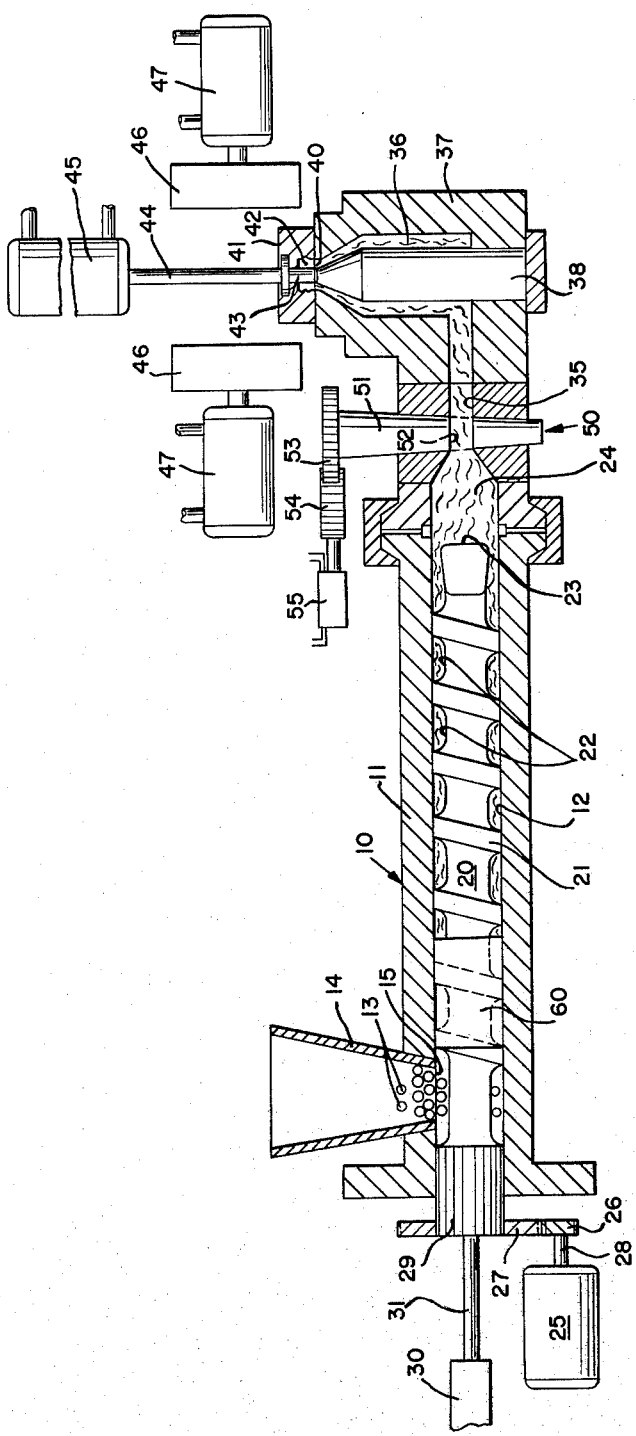
FIGURE 1 is a somewhat schematic, longitudinal sectional view of an intermittently operable plasticizer-extruder of the present invention.

As shown on the drawings:

In FIGURE 1, reference numeral 10 refers generally to a plasticizer-extruder of the present invention.

The plasticizer-extruder of the present invention includes a generally cylindrical barrel 11 defining an interior, axially extending, cylindrical plasticizing chamber 12 adapted to receive pelletized or other solid forms of plastic material 13 from an overhead hopper 14 communicating with the barrel chamber 12 through an inlet opening 15 located adjacent the rear end of the chamber 12.

Projecting longitudinally into the barrel chamber 12 is an elongated, helically threaded screw 20, the helical flights or lands 21 of which cooperate with the inner periphery of the chamber 12 to advance the solid plastic material 13 through the barrel chamber 12. The thread grooves 22 intermediate the lands 21 retain the plastic material therein. The barrel 11 is externally heated, as by electric resistance heaters (not shown), the combination of heat from the heaters and pressure from the screw 20 plasticizing the material 13 as it passes through the plasticizer-extruder 10 to issue at the outlet end 23 of the screw as a plasticized, non-solid mass into an outlet chamber 24.

The screw 20 is rotatably driven by suitable means, as by a motor 25, which may be either electrically or hydraulically driven, and a speed-reducing drive, schematically represented as a pair of drive pinions 26 and 27. The pinion 26 is fixed to the drive shaft 28 of the motor 25, while the drive pinion 27 is mounted for longitudinal displacement relative to the screw 20 by axially extending splines 29 formed integrally with or rotatable with the screw 20. Of course, the gear 27 is supported in suitable bearings (not shown) against axial displacement so that the screw 20 can shift longitudinally, i.e. axially, within the barrel chamber 12 without disrupting the rotatable drive force applied to the screw 20 by means of the motor 25, the motor shaft 28 and the drive pinions 26 and 27.

Constantly urging the screw 20 to the right, i.e. to its position illustrated in FIGURE 1 of the drawings, is a fluid pressure actuated cylinder 30, preferably hydraulically actuated, having its actuating rod 31 abutting the splined rear portion 29 of the screw 20. This cylinder 30 has its left end (not shown) connected to a source of fluid under pressure.

The outlet chamber 24 is provided to receive plasticized material from the barrel chamber 12 (actually from the outlet end 23 of the screw), and this chamber 24 communicates through a reduced passage 35 with an extrusion chamber 36 defined between an extrusion orifice block 37 and an upstanding extrusion mandrel 38, the block 37 and the mandrel 38 cooperating to define an extrusion orifice 40 communicating freely with the chamber 36.

Mounted over the extrusion orifice 40 is a vertically displaceable neck mold 41 having an interior, bottom opening mold cavity 42 into which projects a neck mold core pin 43. The mold 41 is carried by the actuating rod 44 of an upper fluid pressure actuated cylinder 45 for displacing the neck mold 41 vertically from its position illustrated in FIGURE 1. During such vertical displacement of the neck mold 41, a tube is extruded integral with the material previously injection molded in the mold cavity 42, which tube is subsequently enclosed within segmental blow molds 46 by actuation of fluid pressure actuated cylinders 47 so that the extruded tube may be blown to its final configuration. A full disclosure of this combined injection molding, extruding and blowing technique for the formation of plastic articles is to be found in the copending application of Richard C. Allen and Leon E. Elphee, Serial No. 797,276, filed in the United States Patent Office March 4, 1960, and assigned to the assignee of the present invention.

Interposed between the chamber 24, which freely receives plasticized material from the outlet end 23 of the screw, and the extrusion orifice 40 through which such plasticized material is dispensed, is an off-on valve indicated generally at 50. This valve 50 comprises a valve body 51 having a port 52 therethrough registering with the passage 35 to accommodate the flow of plasticized material therethrough, when the valve is positioned as indicated in FIGURE 1 of the drawings. A pinion gear 53 surmounts the valve body 51 and is co-rotatable therewith, this pinion being rotatable by means of a longitudinally displaceable rack 54 meshing with the pinion and actuated for such longitudinal displacement by means of a fluid pressure actuated cylinder 55 of the double acting type.

Figure 2:
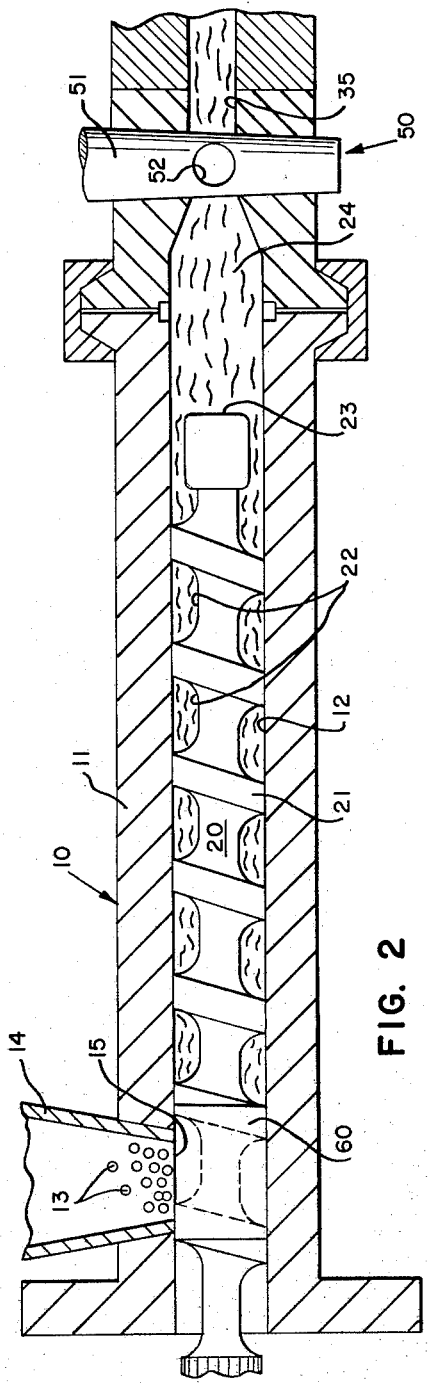
FIGURE 2 is an enlarged view of the plasticizer-extruder of FIGURE 1 in an adjusted, pressure-regulating position.

Upon actuation of the cylinder 55 to extend the rack 54 to the right (as viewed in FIGURE 1 of the drawings), the valve body 51 is turned so that the flow passage 52 thereof is disposed transversely to the passage 35 and the flow of plasticized material therethrough is prevented, as best illustrated in FIGURE 2 of the drawings.

Figure 3:
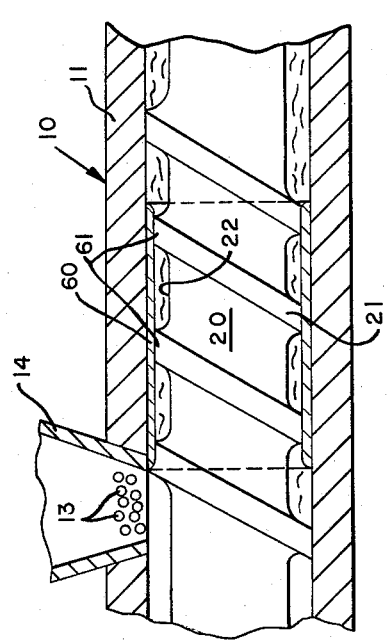
FIGURE 3 is a fragmentary view similar to FIGURE 2 illustrating the plasticizer-extruder in a different operating condition.

The screw 20 carries, adjacent its rear end, a cylindrical sleeve 60 which is secured to the rearmost lands 21 of the screw. These lands 21 (FIGURE 3) covered by the sleeve 60 are truncated, i.e. of reduced radial extent and the grooves 22 are still present beneath the cylindrical sleeve. Thus, the feeding capability of the screw is not impaired when the screw is in its right-hand positions of FIGURES 1 and 3. However, when the screw 20 is moved to the left, as illustrated in FIGURE 2 of the drawings, the sleeve effectively closes the opening 15 between the overhead hopper 14 and the barrel chamber 12. The degree of restriction of the opening 15 is dependent upon the degree of displacement of the screw to the left against the resistance of the cylinder 30, as will be hereinafter more fully described.

*Operation*

In the operation of the device, the normal operation to dispense plasticized material through the orifice 40 is as illustrated in FIGURE 1 of the drawings. When such operation is occurring, the pelletized plastic material 13 falls from the supply hopper 14 through the supply opening 15 onto the rear end of the screw 20. The helical screw flights 21 then convey the plastic material to the right as the screw is driven for rotation by the motor 25 through the gear train 26, 27.

The plasticized material issuing from the outlet end 23 of the screw is supplied to the chamber 24 under pressure and in a heated plasticized condition by virtue of the heat and pressure exerted thereon during its travel through the barrel 11. Assuming that the valve body 51 is turned as illustrated in FIGURE 1, such plasticized material flows through the conduit 35 and the chamber 36 for expression through the orifice 40. If the neck mold 41 is positioned as illustrated in FIGURE 1 of the drawings, the material is first injected into the mold cavity 42 to form the finish or neck portion of a container, or the injection molded portion of other plastic articles which may be manufactured by the process. Next, the cylinder 45 is actuated to retract the actuating rod 44 and to withdraw the neck mold 41 upwardly. At the same time, additional material is issued from the orifice 40 to form a tube integral with the material filling the neck mold cavity 42. The blow molds 46 are closed onto the extruded tube and the tube is inflated to its final configuration interiorly of the segmental blow molds 46.

Returning now to the operation of the plasticizer-extruder screw 20, it will be recalled that the screw is axially shiftable internally of the barrel 11 without interrupting the continuous rotation thereof, due to the splined connection between the screw and the drive gear 27. When the screw is in the position illustrated in FIGURE 1 of the drawings, the fluid pressure cylinder 30, through its actuating rod 31 resists rearward displacement of the screw 20 despite the presence of plasticized material under pressure in the outlet chamber 24.

However, upon closure of the valve 50 as during those periods intermediate the expression of material through the orifice 40, i.e. after extrusion of the tube and prior to return of the injection mold 41 to its illustrated position of FIGURE 1, the continuously rotating screw 20 will continue to express material into the chamber 24. This expression of additional material will, of course, build up the pressure of the plasticized material within the closed chamber 24. Such pressure will be exerted upon the end face of the screw 20 and upon the right hand radial surfaces of the screw ends 21, thus urging the screw to the left against the resistance of the cylinder rod 31.

As the screw is shifted to the left, the sleeve 60 overlying the rearmost lands of the screw and displaceable with the screw is moved underneath the hopper 14 to at least partially close the hopper-to-barrel opening 15. This restriction of the feeding opening of the hopper 14 will, of course, reduce the amount of plastic material being fed to the screw, thereby materially reducing the pressure exerted upon the screw 20 urging the screw in the leftward direction. Actually, this reduction in pressure exerted on the screw and present in the output chamber 24 of the plasticizer-extruder is brought about by the lessening in the volume of plasticized material distributed along the length of the screw. Of course, a relatively small change in volume will effect a large change in the pressure.

Normally, closure of the valve 51 merely restricts the opening 15, although when the valve 40 is closed for extended periods of time, the movement of the screw 20 may be sufficient to completely shut off the filling opening 15. Of course, the presence of the screw grooves 21 intermediate the truncated lands 61 and beneath the sleeve 60 insures the continued feeding of whatever plastic material has entered the rear end of the screw.

Upon opening of the valve 51, the pressure within the closed chamber 24 and along the length of the screw is immediately relieved by the issuance of plasticized material through the orifice 40. This lessening in pressure will allow displacement of the screw to the right by the cylinder 30. Such displacement of the screw will cause the screw to serve as a piston, as well as a screw, and material will be issued through the orifice 40 at the pressure of the piston 30 until the screw occupies its full right hand position as illustrated in FIGURE 1. After this time, the plastic material will be issued from the orifice 40 at the normal output pressures generated solely by the rotatable screw and not by the screw acting as the piston.

From the foregoing, it will be readily appreciated that the present invention provides a new and novel plasticizer-extruder wherein the plasticizing screw is continuously rotatable even through plasticized material is intermittently issued through the dispensing orifice 40. By throttling the feeding of fresh material to the screw, careful control over the pressures generated in the chamber 24 may be maintained. Additionally, the screw may serve as a piston for issuing material from the orifice 40 at pressures greater than those pressures normally developed by rotation of the screw, and such higher pressures may be readily utilized for injection molding operations.

Having thus described my invention, I claim:

1. In an apparatus for intermittently issuing plasticized material through an extrusion orifice, a plasticized screw freely axially displaceable, means for continuously rotating the screw to supply plasticized material from the outlet end thereof to the orifice, valve means controlling communication between the screw and the orifice, means constantly urging the screw in one axial direction in opposition to the pressure of the plasticized material issuing therefrom and urging the screw in the reverse axial direction, a supply hopper for supplying material to be plasticized to said screw, and shielding means carried by the screw and displaceable therewith to be interposed between the hopper and the screw upon displacement of the screw in said reverse direction.

2. A plasticizer for intermittently issuing plasticized material through an orifice and including a barrel receiving solid material from a source through an opening in the barrel, comprising a plasticizer-extruder screw rotatable in said barrel and having a helically threaded surface, a sleeve covering a portion of said surface, means for continuously rotating the screw to advance material under pressure from said source toward the orifice, valve means for interrupting and establishing communication between the screw and the orifice, and fluid pressure means constantly urging said screw toward the orifice against the pressure of material advanced by the screw, interruption of screw-orifice communication increasing the pressure of material to displace the screw against the fluid pressure means and positioning the sleeve across said barrel opening to throttle the feeding of solid material to the screw.

3. A plasticizer capable of intermittently issuing plasticized material through an orifice, comprising an axially shiftable plasticizer screw, a supply hopper for supplying raw material to the rear end of the screw through a hopper opening, means for continuously rotating the screw to supply pressured plasticized material to the orifice, means urging the screw axially forwardly toward the orifice, an increase in the pressure of material supplied by the screw upon interruption of screw-orifice communication shifting the screw rearwardly from the orifice, and a shielding sleeve fixed to the screw and progressively closing the hopper opening to reduce the volume of material supplied to the screw as the screw is shifted rearwardly.

4. In a method of intermittently operating a plasticizer of the screw type, the steps of rotating the screw to normally supply plasticized material at a predetermined pressure to a dispensing orifice, constantly urging the screw toward the orifice against the pressure developed by screw rotation, interrupting communication between the screw and the orifice, continuing to rotate the screw to develop pressures in the material supplied thereby in excess of said predetermined pressure, displacing the screw axially from the orifice and restricting the amount of material supplied to the screw in accordance with the degree of displacement of the screw.

5. In an apparatus for intermittently issuing plasticized material through an extrusion orifice, a plasticizer screw both rotatably and axially displaceable, said screw having an outlet end and an inlet end, means for continuously rotating the screw to supply plasticized material from the outlet end thereof to the orifice, a fluid actuated cylinder constantly urging the screw axially toward the orifice in opposition to the pressure of the plasticized material supplied by the screw, a supply hopper for supplying raw plastic material to the inlet end of said screw, and a sleeve covering a portion only of the screw adjacent the inlet end, displacement of the screw from the orifice when the pressure of material supplied by the screw overcomes the force exerted on the screw by the cylinder interposing said sleeve between the remainder of the screw and the supply hopper to prevent the entry of raw material to the remainder of the screw.

6. In a shiftable screw-type plasticizer-extruder wherein the screw is advanced in its barrel toward an orifice to express plasticized material therethrough and is retracted from the orifice to accumulate a body of material between the orifice and the forward end of the screw, the improvements accommodating continuous rotation of the screw even after the body of material is fully accumulated, comprising a feed opening at the rear portion of said barrel through which raw plastic material is normally supplied to the screw, and a sleeve fixed to the exterior periphery of said screw for movement therewith, the sleeve being located axially of the screw so as to block said feed opening when the screw is fully retracted upon full accumulation of said body of material.

References Cited in the file of this patent

UNITED STATES PATENTS

| | | |
|---|---|---|
| 1,914,486 | Burton | June 20, 1933 |
| 2,505,540 | Goldhard | Apr. 25, 1950 |
| 2,566,854 | Rhodes | Sept. 4, 1951 |
| 2,629,132 | Willcox et al. | Feb. 24, 1953 |
| 2,831,214 | Eyles et al. | Apr. 22, 1958 |